Jan. 8, 1957 — F. S. JONES — 2,776,519
ANIMAL TRAP
Filed March 12, 1953 — 2 Sheets-Sheet 1
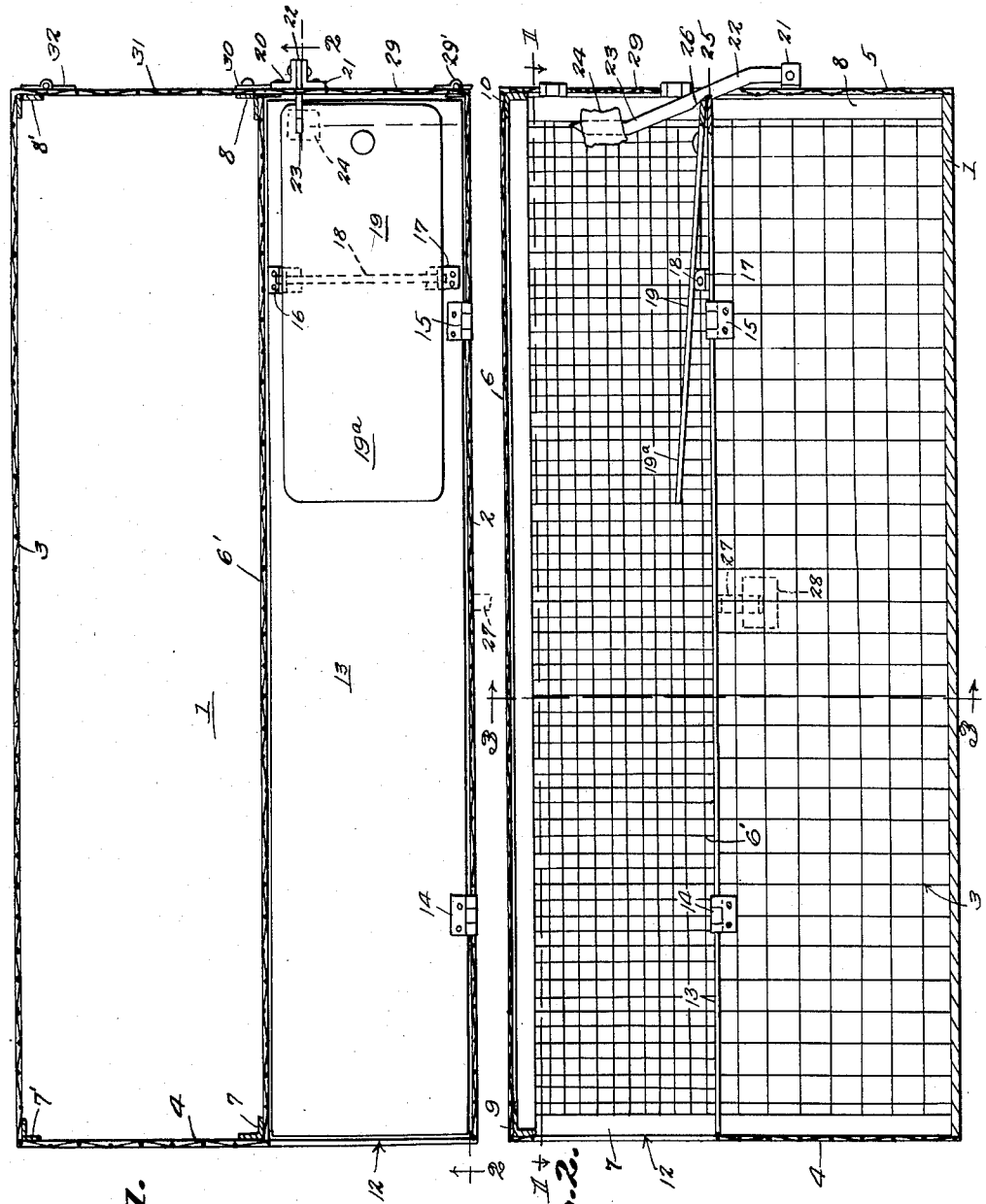
Floyd S. Jones
INVENTOR
BY C. A. Snow & Co.
ATTORNEYS.

Jan. 8, 1957  F. S. JONES  2,776,519
ANIMAL TRAP
Filed March 12, 1953  2 Sheets-Sheet 2
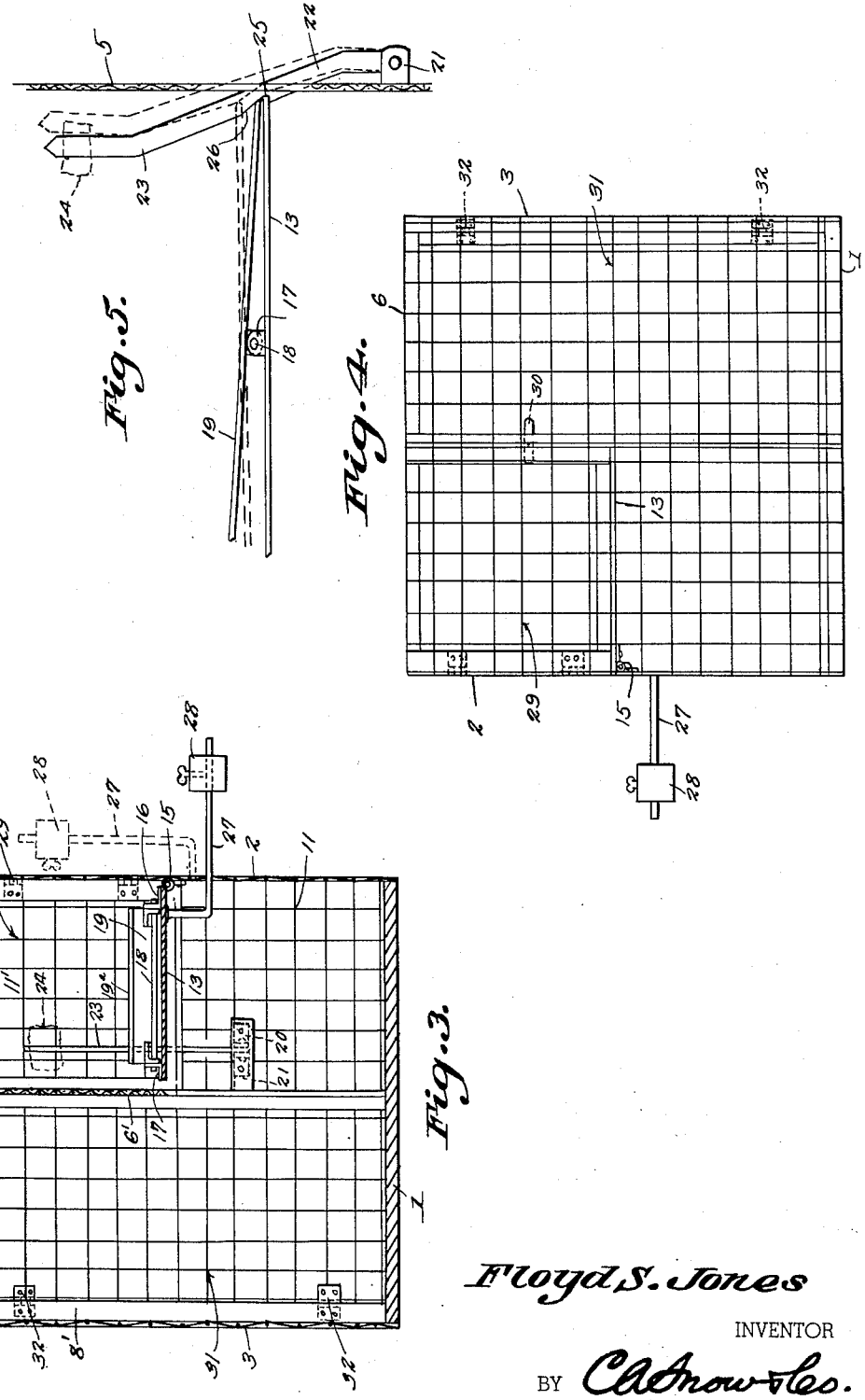
Floyd S. Jones
INVENTOR
BY C.A.Snow&Co.
ATTORNEYS.

United States Patent Office 2,776,519
Patented Jan. 8, 1957

2,776,519

ANIMAL TRAP

Floyd S. Jones, Durham, N. C.

Application March 12, 1953, Serial No. 341,923

1 Claim. (Cl. 43—70)

This invention relates to an animal trap for trapping such animals as rodents or similar animals and which is provided with two separate means for operating the tripping mechanism of the trap for depositing the animals into a confining compartment, one of such means being actuated by the weight of the animal and the other of such means being actuated or released by the motion of the animal in an attempt to reach the bait supported on the means for tripping the trap, the trap being provided with automatic means for resetting the trap to catch another animal.

One of the objects of the invention is to provide an animal trap having the above described distinguishing features and characteristics which is simple in operation and cheap in construction and well adapted for quantity production at extremely low cost.

Further and more limited objects of the invention will appear as the description proceeds and by reference to the accompanying drawings in which similar parts are designated by similar reference characters.

Referring now to the drawings:

Fig. 1 is a horizontal sectional view taken on the line 1—1 of Fig. 2 and showing my improved animal trap.

Fig. 2 is a vertical sectional view taken on the line 2—2 of Fig. 1.

Fig. 3 is a vertical sectional view taken on the line 3—3 of Fig. 2.

Fig. 4 is an end view of the trap without the tripping mechanism and

Fig. 5 is a detailed view in elevation showing the tripping mechanism for the trap.

Referring now to the drawings in detail my improved trap consists essentially of a generally rectangular box having an imperforate bottom wall 1, side walls 2 and 3, end walls 4 and 5 and a top wall 6 which is secured at the ends thereof to angular brackets 7, 7', 8 and 8' as by welding or the like. Extending transversely of the box are a pair of horizontally disposed angle irons 9 and 10 to which the top and end walls are secured in any suitable manner as by welding. All of the walls except the bottom wall are preferably formed of suitable wire screening or mesh. A longitudinally extending vertical partition 6' divides the box into a compartment 11' which extends lengthwise of the trap and along one side thereof and which has an opening 12 at the end 4 thereof opposite the wall 5 through which an animal may enter the trap. A trap door 13 disposed intermediate the top and bottom walls of the box forms the bottom of the compartment 11 and extends the full length thereof and is hingedly secured to the outer wall 2 by hinges 14 and 15. Secured to the trap door 13 are a pair of brackets 16 and 17 through which extends a rod or pin 18 which pivotally supports the trigger plate 19 the purpose of which will hereinafter appear. Mounted on the exterior of the end wall 5 are a pair of angle brackets 20 and 21 and pivotally secured at one end to these brackets is a keeper or latch bar 22 the upper portion 23 of which is bent at an angle and extends through a slot in the wall 5 and has its upper end shaped to receive and retain a bait 24. The latch bar 22 is provided intermediate its ends with a notch 25 formed with a horizontal shoulder and a contiguous upwardly and inwardly inclined trap door releasing surface 26. When the trap is set the parts occupy the position shown in full lines in Fig. 5. The trap door 13 is held in a horizontal position with an end thereof resting on the horizontal shoulder of the notch 25 and the right hand edge of the trigger plate 19 bearing against the inclined door releasing surface 26 contiguous to the notch 25. The trigger plate 19 has an enlarged end or treadle portion 19a of substantial area disposed at one side of the pivot pin 18. When the weight of a rat depresses the surface 19a, the opposite end of the trigger plate 19 will be tipped or rocked upwardly and the latch bar 22 will be moved to the position shown in dotted lines in Fig. 5 to release the trap door 13 to permit it to tip to a position to deposit the animal into a lower compartment 11, which is generally L shaped in cross section. Carried by the trap door 13 is an L-shaped rod 27 the outer end of which extends through a slotted opening in the wall 2 and has adjustably secured thereon a weight 28 which serves to return the trap door 13 to a horizontal position. The bar 22 is so mounted and shaped that it tends to assume the position shown in full lines in Fig. 5 to reset the trap after the animal has been deposited into the lower compartment. The compartment 11' is closed at the end remote from the entrance opening 12 by a door 29 mounted on suitable hinges 29' and locked by a fastener 30. A door 31 mounted on hinges 32 closes the lower compartment, adjacent to compartment 11' through which the trapped animal may be removed. It will thus be seen that the trap is tripped either by the weight of the animal on the end portion 19a of the plate 19 or by the animal pushing against the latch bar 22 in an effort to reach the bait. It will also be seen that the latching and tripping mechanism as well as the bait are not accessible to the trapped animal.

The animal enters the trap through the door 12 then proceeds toward the bait. Should the animal jump on the end portion 19a of the plate 19, the plate will be tipped about its pivot pin 18 to move the latching bar 22 to a position shown in dotted lines in Fig. 5 which releases the trap door and deposits the animal into the trap. Should the animal jump onto the righthand end portion of the plate 19 adjacent to the bait, he will then reach for the bait and push against the upper end of the lever or latching bar 22 and actuate it to release the trap door. In any event the animal is deposited into the bottom compartment and the weight 28 functions to return the trap door to its normally set position as shown in full lines in Fig. 5.

It will now be clear that I have provided an animal trap which will accomplish the objects of the invention as hereinbefore stated. It is to be understood that various changes may be made in the arrangement of parts and the details of construction without departing from the spirit of my invention. The invention therefore is limited only in accordance with the scope of the appended claim.

What is claimed is:

An animal trap comprising a rectangular box formed of an imperforate bottom wall and perforate side, end and top walls, a longitudinally disposed vertical partition in said box, an imperforate trap door hinged to one of said side walls and extending inwardly therefrom to a point closely adjacent said partition, an L-shaped bar fixed to the lower side of said door and projecting outwardly through said one side wall, a balancing weight adjustably mounted on the projecting side of said bar, a combined keeper and bait holding member pivotally carried by an end wall and having a keeper notch wherein an end of said door engages for normally holding said door in horizontal set position, said notch having a horizontal shoulder and an upwardly and inwardly inclined door releasing surface, and a trigger plate pivotally carried by and overlying said door and having one end thereof engaging in said notch, the other end of said trigger being raised above said door whereby weight on said trigger will effect upward rocking of said one end to thereby swing said keeper outwardly to door releasing position.

References Cited in the file of this patent

UNITED STATES PATENTS

| | | | |
|---|---|---|---|
| 145,082 | Arnold | Dec. 2, | 1873 |
| 507,000 | Hagar et al. | Oct. 17, | 1893 |
| 572,811 | Krauth | Dec. 8, | 1896 |
| 834,415 | Scott | Oct. 30, | 1906 |
| 934,695 | Reynolds | Sept. 21, | 1909 |
| 1,182,277 | Jones | May 9, | 1916 |
| 1,217,056 | Pickering | Feb. 20, | 1917 |
| 1,488,769 | Vining et al. | Apr. 1, | 1924 |
| 1,807,537 | Kimbrell | May 26, | 1931 |

FOREIGN PATENTS

| | | |
|---|---|---|
| 111,873 | Great Britain | 1917 |